United States Patent Office 2,944,360
Patented July 12, 1960

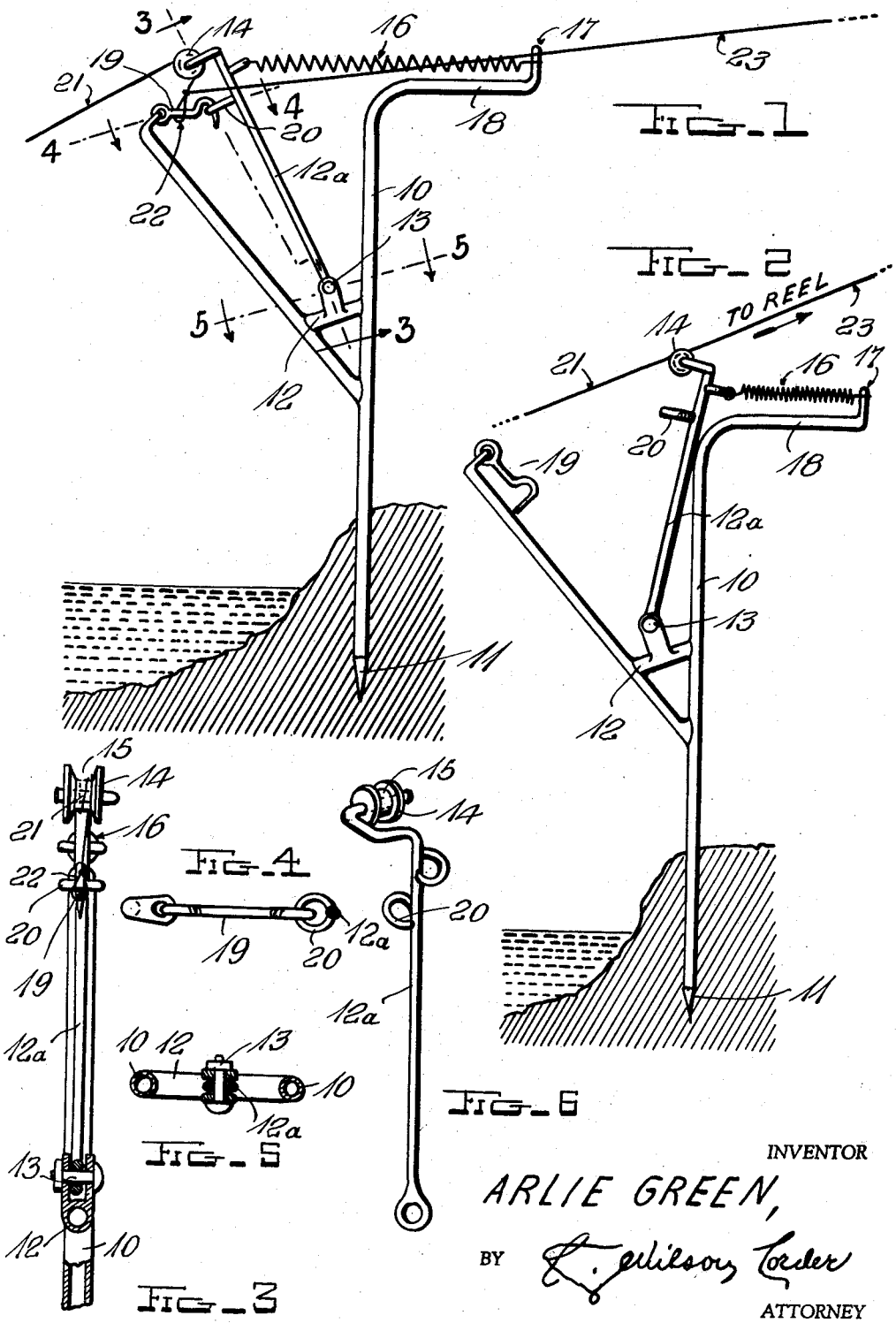

2,944,360

TRIGGER FISHING DEVICES

Arlie Green, 2758 Bristol Drive NE., Atlanta, Ga.

Filed Sept. 10, 1957, Ser. No. 683,148

1 Claim. (Cl. 43—16)

This invention relates to the sport or art of fishing, and more particularly to a new and improved device for automatically hooking a fish and holding him until reeled out of the water in a conventional manner. To this extent it may be characterized as a "silent fisherman."

Heretofore several devices of this general type have been proposed, but they have not been successful because of too great complexity, expense of manufacture and maintenance, the requirement of constant or semi-constant presence of the fisherman, and for other reasons.

An object of the instant invention is to provide an automatic device for catching fish.

Another object is to provide such a device that is positive and certain in its action and substantially fool proof.

Another object is to provide economy of manufacture in such a device.

A still further object is to provide a silent fisherman that does not require the constant presence of the person doing the fishing.

Another object is to provide means for securing such an instrumentality in the ground, as on the bank of a stream or lake.

Another object is to provide a simple and effective method of line-handling in such a device.

These and other objects made apparent during the further progress of this specification are accomplished by means of the instant silent fisherman, a full and complete understanding of which is facilitated by reference to the drawing herein, in which:

Fig. 1 is a side view of said device, set up, triggered and ready to catch fish;

Fig. 2 is similar to Fig. 1, but shows the device after it has been actuated or set off by a fish, which may now be reeled in.

Fig. 3 is a view taken along the line 3—3 of Fig. 1, looking in the direction of the arrows;

Fig. 4 is a similar view taken along the line 4—4 of Fig. 1.

Fig. 5 is taken along the line 5—5 of Fig. 1; and

Fig. 6 a detailed view in perspective showing the actuating arm of the device and certain related structure.

Referring now to the drawing, in which like numerals indicate corresponding parts throughout, it will be seen that the device comprises a generally Y-shaped supporting frame 10, having a sharp stake end for inserting into the ground as shown at 11, and a cross brace member 12 to which is mounted the actuating arm 12a as by a suitable pivot 13, the arm then being able to move freely either to the left or to the right. At one end of 12a is mounted a roller 14 having an indented peripheral edge 15; and a coil spring 16 is affixed adjacent 14, said spring 16 being secured at its opposite end 17 to an extension 18 of frame 10 and normally drawing arm 12a to the right.

A hook 19 is pivotally secured to the left fork of frame 10, and cooperating with an eyelet 20 in 12a, triggers the arm against the tension of spring 16 in the manner shown in Fig. 1. A fish line 21 engages hook 19 with a slip-knot 22, is passed around roller 14 in a double loop, and thence passes to the left to the water. A hook, suitable weights, et cetera (not shown) are placed on the end of the line. To the right said line passes to a conventional reel (not shown) as at 23.

The operation of the device is as follows:

Line 21 is baited and thrown into the water, said line having been affixed to hook 19 and passed around roller 14 as aforesaid. Hook 19 is now secured lightly in eyelet 20, thereby triggering arm 12a against substantial spring tension. A fish working on the action end of the line, causes 19 to disengage, thereby permitting 12a to move sharply to the right and securely hooking the fish. The line is then removed from its slip-knot connection with 19 and the fish reeled in conventionally, after which the action is repeated.

The instant device has been found positive and effective in its action, and automatically exerts just the right amount of jerk to hook the fish without tearing its mouth, as rather frequently happens with tender-mouthed denizens of the deep, such as carp for example. In that case the fish usually gets away.

While there has been described in considerable detail herein, one form of the instant invention, no limitation is implied thereby it being apparent that changes, re-arrangements, additions and subtractions may be resorted to without departing from the scope of the following claim, which is to be given an interpretation fairly in keeping with the contribution to the art.

I claim:

A device of the character described comprising; a generally Y-shaped supporting frame having upstanding portions defining forks, an actuating arm pivotally mounted at one end between said forks and having a roller element mounted on its free end, a spring urging said arm toward one fork of said Y-shaped frame, a hook mounted on the other fork, means on said arm for releasably engaging said hook and a fish line extending from the direction of said other fork looped around said roller and removably attached to said hook so that a pull on said line in the direction of said other fork will release the hook and cause the spring to swing the arm and roller toward said one arm and thereby jerk the said extending end of the line.

References Cited in the file of this patent

UNITED STATES PATENTS

| | | |
|---|---|---|
| 975,822 | Becker et al. | Nov. 15, 1910 |
| 1,488,838 | Savoie | Apr. 1, 1924 |
| 2,804,277 | Kinder | Aug. 27, 1957 |
| 2,841,912 | Ening | July 8, 1958 |

FOREIGN PATENTS

| | | |
|---|---|---|
| 84,608 | Sweden | Oct. 15, 1935 |